Figure 6:
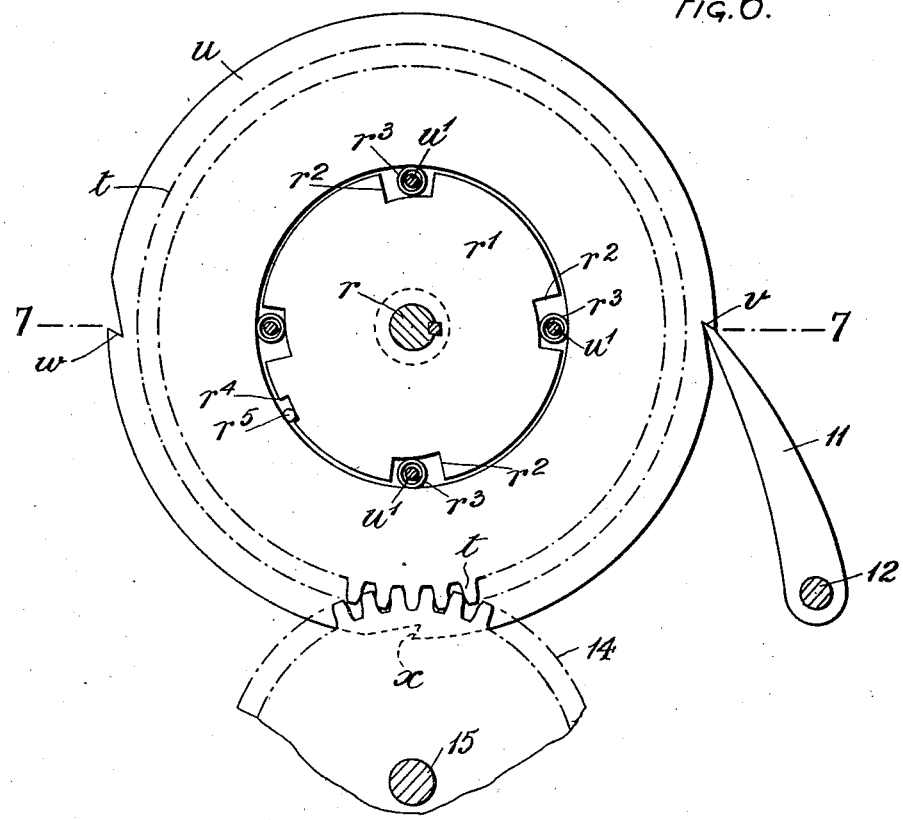

Aug. 17, 1926.   H. W. EVANS   1,596,165
MACHINE FOR MAKING CONCRETE BUILDING BLOCKS AND THE LIKE
Filed May 11, 1925   3 Sheets-Sheet 1
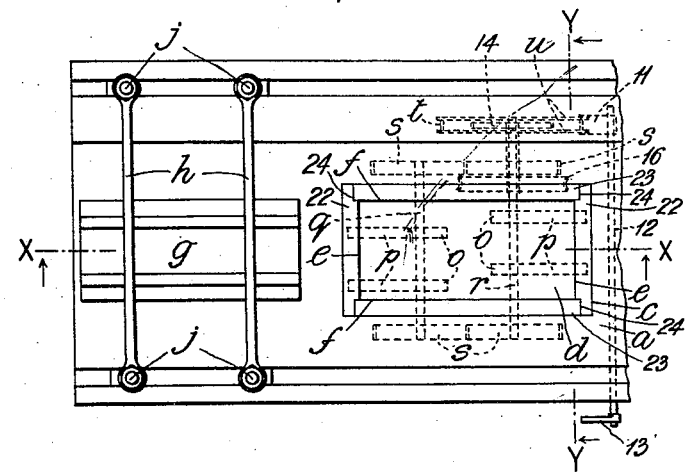
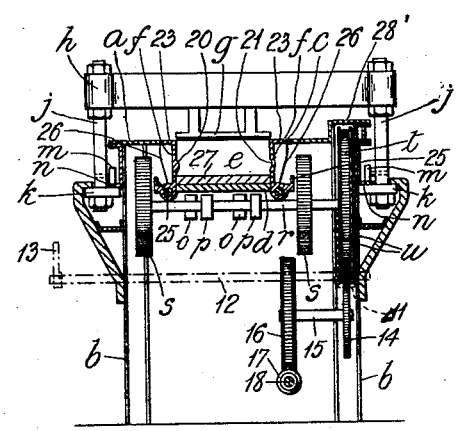
Inventor
H. W. Evans
by Wilkinson & Giusta
Attorneys.

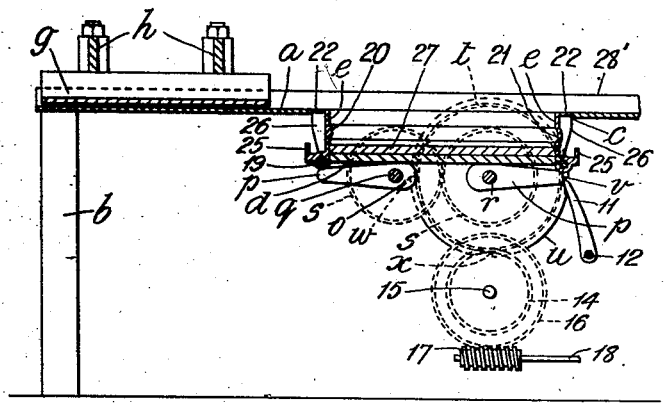

Aug. 17, 1926.                                              1,596,165
H. W. EVANS
MACHINE FOR MAKING CONCRETE BUILDING BLOCKS AND THE LIKE
Filed May 11, 1925    3 Sheets-Sheet 3

Inventor
H. W. Evans
by Wilkinson & Giusta
Attorneys.

Patented Aug. 17, 1926.

1,596,165

UNITED STATES PATENT OFFICE.

HERBERT WILLIAM EVANS, OF BROMLEY, ENGLAND.

MACHINE FOR MAKING CONCRETE BUILDING BLOCKS AND THE LIKE.

Application filed May 11, 1925, Serial No. 29,549, and in Great Britain May 20, 1924.

This invention relates to a machine for making concrete building blocks, partition slabs, and the like in which the compression and ejection are effected by reciprocatory motion, and in which a movable abutment is employed, and has for its object improved means for compressing the material of which the block or the like is made and for delivering the finished block. A further object of the invention is to provide an improved moulding machine to which power may be applied continuously but so as to become effective only at the will of the operator.

The improved machine of the present invention comprises a frame or table, in a recess or aperture in which a mould is adapted to be reciprocated, an abutment plate adapted to be slidden opposite the mould and to be received therein during the compression stroke thereof and means for reciprocating the mould ($a$) to compress material therein and ($b$) to deliver the finished block or the like.

For this purpose it is desirable ($a$) that the reciprocation of the mould should be effected through cam mechanism adapted to raise and lower the mould, the raising being to a greater extent when the finished block or the like is to be delivered, than when material in the mould is to be compressed and ($b$) that when the mould is raised to deliver the finished block or the like the sides of the said mould shall be movable automatically.

The mould preferably comprises a bed plate, to the sides (which term includes the ends) of which are pivoted side walls adapted to be swung from positions in which their inner faces are, e. g. normal to the surface of the bed plate, to positions in which said inner faces lie in the same plane as the surface of the bed plate. The automatic opening of the mould sides may be effected by providing said sides with heels adapted when the mould is raised to the full extent in the recess or aperture in the frame or table to engage an abutment such as the underside of said frame or table and cause the sides to swing outwards. Preferably the sides are formed exteriorly with cam surfaces adapted to coact with the edges of the recess or aperture in the frame or table to control the outward movement of the sides so that it may be progressive as the mould rises.

In order that the opening of the sides of the mould may take place only when the finished block or the like is to be delivered, said mould is preferably raised and lowered by means of one or more double-throw cams, the smaller throw of which though sufficient to effect the desired compression of the material in the mould is insufficient to bring the heels on the sides of the mould into engagement with the underside of the frame or table whilst the cam surfaces on said sides are so formed that during such part of the upward movement of the mould as corresponds with the compression stroke said sides are constrained to preserve their positions normal to the bed plate.

In order accurately to position the sides relatively to one another when in their closed positions, it is desirable that some of them should be rebated to receive the ends of the adjacent sides.

The driving of the cam mechanism is preferably effected through unidirectional power transmission mechanism adapted to transmit power at will and automatically to cut off the power at predetermined moments according to the positions of the mould and associated parts.

In the accompanying drawings, which are partly diagrammatic and which illustrate one form of the invention as applied to a machine for making concrete or coke breeze partition slabs, Figure 1 is a partial plan view, Figures 2, 3 and 4 are partial sections on the line X X, Figure 1 showing the mould and associated parts in the positions which they occupy, Figure 2 when the mould is ready to be filled, Figure 3 when the slab is fully compressed, and Figure 4 when the finished slab is delivered, whilst Figure 5 is a section substantially on the line Y Y, Figure 1, showing the mould in its lowered position with the abutment plate thereover.

Figure 7:
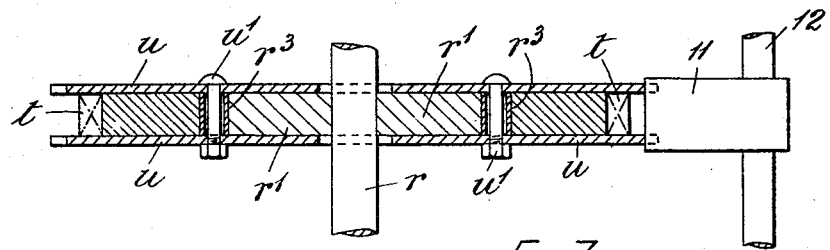

Figures 6 and 7 are views drawn to a larger scale showing the unidirectional power transmission mechanism, Fig. 6 being a sectional elevation with one of the cheek plates removed, whilst Figure 7 is a section on line 7—7 of Figure 6.

As shown the table $a$ mounted on legs $b$ is formed with an aperture $c$ through which is adapted to be raised and lowered a rectangular mould consisting of a bed plate $d$ and four sides $e\ e,\ f\ f$, whilst an abutment plate $g$ is adapted to be moved over and to be retracted from above, said mould, the plate $g$ being carried by cross bars $h\ h$ mounted on pillars $j$ ... which are connected by tie bars $k\ k$ and furnished with rollers $m$ running on rails $n$.

Beneath the bedplate $d$ of the mould two pairs of double throw cams $o\ p$ ... are mounted on cross shafts $q\ r$ furnished at their opposite ends with intermeshing gear wheels $s$, so that the cams $o\ p$ may be moved similarly and simultaneously and on the shaft $r$ is mounted unidirectional power transmission mechanism, such for instance as is described in the specification of British Patent No. 227,705, the said mechanism comprising a disc like member $r'$ keyed to the shaft $r$ and disposed within an annular gear wheel $t$ and an intermediate free wheel mechanism consisting of a plurality of tapered recesses $r^2$ containing tubular rollers $r^3$ adapted in the well known manner to couple together the driving gear wheel $t$ and the disc $r'$ when the former is rotated towards the smaller ends of the recesses $r^2$, that is to say, clockwise in Fig. 6. On either side of the driving gear wheel $t$ and the driven disc like member $r'$ are mounted a pair of cheek plates $u\ u$ of greater diameter than the gear wheel $t$, and passing through said cheek plates and through each of the hollow rollers $r^3$ is a transverse rod $u'$.

The cheek plates $u\ u$ are each formed with three angularly spaced notches $v\ w$ and $x$, in order that they may be engaged automatically and held against rotation by a pawl 11, on a cross shaft 12 having an operating lever 13 in order that the pawl 11 may be disengaged from said cheek plates at the will of the operator and the shaft $r$ coupled with the gear wheel $t$ by the automatic action of the unidirectional power transmission mechanism. The gear wheel $t$ meshes with a pinion 14 fast on a shaft 15 on which is also secured a worm wheel 16 adapted continuously to be driven by a worm 17 on a shaft 18.

To prevent overriding from taking place the driven member $r'$ may be formed with an additional tapered recess $r^4$, the angular disposition of the said recess $r^4$ relatively to the cams $o\ p$ being such that as the mould descends, as hereinafter described, after delivery of the finished block the smaller end of the said process will be lowermost and the roller $r^5$ will be in position to couple the driven member $r'$ to the driven gear wheel $t$ if the former tends to move faster than the latter.

The double throw cams $o\ p$ ... are adapted at one angular position to support the bed plate $d$ of the mould so that the upper edges of the sides $e\ e\ f\ f$ of the mould are flush with the upper surface of the table $a$ as shown in Figures 2 and 5; at another angular position to raise said bed plate by their shorter arms $o$ to the compression position shown in Fig. 3; and at a third angular position to raise said bed plate by their longer arms $p$ to the delivery position shown in Figure 4.

The sides $e\ e\ f\ f$ of the mould are each hinged as at 19 to the bed plate $d$ and are adapted to occupy positions as shown in Figures 1, 2, 3 and 5 in which their inner surfaces are normal to the surface of the bed plate $d$, or as shown in Figure 4, in which said surfaces are all in the same horizontal plane the inner faces of said sides are formed with projections 20 and recesses 21 so as to produce on the edges of the finished slabs the usual tongues and grooves and the sides $f\ f$ are formed with flanges 23, 23, which when the mould is in its lowered position, are flush with the table $a$, the sides $e\ e$ and flanges 22, 22, being rebated as at 24, Figure 1, to receive the ends of the sides $f\ f$ and flanges 23, 23 to preserve the rectangular relationship of said sides when the mould is in its closed position. Further the sides $e\ e\ f\ f$ are formed at their outer faces with heels 25 adapted to engage the underside of the table $a$ when the bed plate $d$ is raised by the longer arms $p\ p$ of the double throw cams $o\ p$ ... to the delivery position and with cam surfaces 26, adapted to coact with the edges of the aperture $c$ in the table $a$ as the mould rises to control the outward movement of said sides so that it may be progressive. It is to be observed that the upper parts of the cam surfaces 26 are parallel with the inner surfaces of the sides $e\ e\ f\ f$ to an extent corresponding with the throw of the shorter arms $o\ o$ of the cams $o\ p$ ... so that during the compression stroke of the mould said sides are constrained to preserve their positions normal to the bed plate.

In use, assuming the shaft 18 to be driven continuously the mould and the associated parts to be in their lowered positions as shown in Figures 2 and 5, the pawl 11 to be engaged in the notch $v$ and the abutment plate $g$ to be in the retracted position shown in Figure 1, a fillet 27 of wood or the like, of predetermined thickness is laid on the bed plate $d$, the mould is then charged with concrete coke breeze or the like 28 and the abutment plate $g$ is slidden over the mould. On rocking the operating lever 13 to disengage the pawl 11 from the notch $v$, the cheek plates $u$ become automatically coupled and rotate as one with the gear wheel $t$, thus driving the shafts $r$ and $q$ and the cams $o\ p$ ... the shorter arms $o$ of which latter raise the moulds to the position shown in Figure 3 and compress the material 28 against the abutment plate $g$. The shafts $q\ r$ continue to rotate until, after a half revolution, i. e. the mould rises and falls, the pawl 11 falls into the notch $w$ in the cheek plates $u\ u$ whereupon further rotation of said cheek plates is arrested and they are disconnected automatically from the gear wheel $t$. The abutment plate $g$ is then retracted to the position shown in Figure 1 and the operating lever 13 is rocked to disengage the pawl 11 from the notch $w$, thus enabling the cams $o\ p\ \ldots$ again to be driven. The longer arms $o\ p\ \ldots$ of said cams raise the mould to the position shown in Figure 4, the sides $e\ e\ f\ f$ being caused progressively to fold outwards as a result of the engagement of the heels 25 with the underside of the table $a$, such outward movement being controlled by the cam surfaces 26. After one quarter of a revolution of the shafts $q\ r$ the pawl 11 falls into the notch $x$ and brings about the automatic cutting off of the power. The finished slab may then be lifted away on the fillet 27 and the operating lever 13 rocked to disengage the pawl 11 from the notch $x$, whereupon the cams $o\ p\ \ldots$ are again driven to lower the mould until the power is again cut off as a result of the engagement of the pawl 11 in the notch $v$. During the lowering of the mould the coaction of the cam surfaces 26 with the edges of the aperture $c$ in the table $a$ causes the sides $e\ e\ f\ f$ to be folded inwards, the extent of such inward movement being limited by the interengagement of the rebated ends of the sides $e\ e$ with the ends of the sides $f\ f$. The cycle of operations is then repeated.

In order to facilitate removal of the finished slab on the fillet 27, one side of the table $a$ may be offset upwardly as at 28' to the level of the bed plate $d$ when the latter is in the delivering position, the offset portion 28' being spaced from the aperture $c$ just sufficient distance to allow the adjacent side $f$ to fold outwardly.

It is particularly to be observed that although the shaft 18 is driven continuously each phase in the cycle of operations must be indicated at will, by rocking the lever 13, and that the power is cut off automatically at the end of each phase.

What I claim as my invention and desire to secure by Letters Patent is:—

1. An improved machine for making blocks of plastic material comprising the combination of a table having an aperture therein, a reciprocal mould located in said aperture and comprising a bed plate and side walls attached thereto by hinges at their lower ends, an abutment plate of a size fitting within the side walls of the mould, means for sliding said abutment plate into and out of position opposite the mould, means for imparting a double reciprocating movement to the mould at each moulding operation to raise the mould to receive the abutment plate within the entrance thereof and compress the material in the mould, to retire the mould, to release the sliding abutment plate, and to raise the mould to deliver the finished block therefrom.

2. An improved machine for making blocks of plastic material comprising the combination of a table having an aperture therein, a reciprocal mould located in said aperture, an abutment plate, cam mechanism for raising and lowering the said mould to compress the material therein and to deliver the finished blocks therefrom, the raising being to a greater extent when the finished block is to be delivered than when the material in the mould is to be compressed.

3. An improved machine for making building blocks of plastic material comprising the combination of a table having an aperture therein, a mould located in said aperture and having foldable sides, automatic means for folding the sides of the mould outwardly when the latter is raised to deliver the finished block, an abutment plate, means for sliding said abutment plate into and out of position opposite the mould, cam mechanism for raising and lowering the said mould to compress the material therein and to deliver the finished blocks therefrom, the raising being to a greater extent when the finished block is to be delivered than when the material in the mould is to be compressed.

4. An improved machine for making blocks of plastic material comprising the combination of a table having an aperture therein, a mould located in said aperture, and comprising a bed plate and side walls pivoted thereto, the pivots being so located that the side walls are swung from positions in which their inner faces are, e. g. normal to the surface of the bed plate to positions in which said inner faces lie in the same plane as the surface of the bed plate, means for causing the side walls of the mould to automatically swing from their closed to open position and vice versa, an abutment plate, means for sliding said abutment plate into and out of position opposite the mould, means for reciprocating the mould to receive the abutment plate therein, to compress the material and to deliver the finished blocks therefrom.

5. An improved machine for making blocks of plastic material comprising the combination of a table having an aperture therein, a mould located in said aperture and comprising a bed plate and side walls pivoted thereto, the pivots being so located that the side walls are swung from positions in which their inner faces are, e. g. normal to the surface of the bed plate to positions in which said inner faces lie in the same plane as the surface of the bed plate, the sides of the said mould being provided with heels which engage the underside of the said table when the mould is raised to its full extent and whereby said sides are swung outwardly, an abutment plate, means for sliding said abutment plate into and out of position opposite the mould, means for reciprocating the mould to receive the abutment plate therein, to compress the material and to operate the folding sides of the mould to deliver the finished blocks therefrom.

6. An improved machine for making blocks of plastic material comprising the combination of a table having an aperture therein, a mould located in said aperture and comprising a bed plate and side walls pivoted thereto, the pivots being so located that the side walls are swung from positions in which their inner faces are, e. g. normal to the surface of the bed plate to positions in which said inner faces lie in the same plane as the surface of the bed plate, the sides of the said mould being provided with heels which engage the underside of the said table when the mould is raised to its full extent and whereby said sides are swung outwardly, cams formed on the outside of the hinged side walls of the mould and coacting with the edges of the aperture in the table and whereby the outward movement of the said hinged sides is progressive as the mould rises, an abutment plate, means for sliding said abutment plate into and out of position opposite the mould, means for reciprocating the mould to receive the abutment plate therein to compress the material and to deliver the finished blocks therefrom.

7. An improved machine for making blocks of plastic material comprising the combination of a table having an aperture therein, a mould located in said aperture and comprising a bed plate and side walls pivoted thereto, the pivots being so located that the side walls are swung from positions in which their inner faces are, e. g. normal to the surface of the bed plate to positions in which said inner faces lie in the same plane as the surface of the bed plate, some of the pivoted sides of the mould being rebated at their ends, means for causing the side walls of the mould to automatically swing from their closed to open position and vice versa, an abutment plate, means for sliding said abutment plate into and out of position opposite the mould, means for reciprocating the mould to receive the abutment plate therein, to compress the material and to deliver the finished blocks therefrom.

8. An improved machine for making blocks of plastic material comprising the combination of a table having an aperture therein, a reciprocal mould located in said aperture, devices for reciprocating the mould in said aperture, an abutment plate, means for sliding said abutment plate into and out of position opposite the mould, a unidirectional power transmission mechanism for driving the said mould reciprocating devices and wherein the power is transmitted at will and automatically cut off at predetermined moments according to the positions of the mould and associated parts.

9. An improved machine for making blocks of plastic material comprising the combination of a table having an aperture therein, a reciprocal mould located in said aperture, devices for reciprocating the mould in said aperture, an abutment plate, means for sliding said abutment plate into and out of position opposite the mould, a unidirectional power transmission mechanism for driving the said mould reciprocating devices consisting of a disc like driven member formed with a plurality of peripheral recesses the bottoms of which are tapered eccentrically, an annular gear wheel driving the mould reciprocating devices and within which gear wheel said disc like driven member is disposed, a plurality of tubular rollers disposed transversely one in each of said recesses in the driven member, a pair of cheek plates disposed one on each side of the driven member and provided with a series of peripheral notches, a circular series of transverse rods passing one through each of said tubular rollers and connecting the said cheek plates together, a pawl for engaging said peripheral notches in the cheek plates and means for causing the pawl to engage and disengage the said peripheral notches.

10. An improved machine for making blocks of plastic material comprising the combination of a table having an aperture therein, a reciprocal mould located in said aperture, devices for reciprocating the mould in said aperture, an abutment plate, means for sliding said abutment plate into and out of position opposite the mould, a unidirectional power transmission mechanism for driving said mould reciprocating device and consisting of a disc like driven member and an annular gear wheel coupled thereto by free wheel mechanism and in driving connection with said mould reciprocating device, cheek plates embracing said annular gear wheel and the disc like driven member, means for arresting the motion of said cheek plates at will or automatically whereby power may be transmitted to the mould at will and automatically cut off at predetermined positions of the mould and associated parts.

HERBERT WILLIAM EVANS.